Oct. 27, 1970            G. L. ISAACS            3,535,900
APPARATUS FOR REMOVING MATERIAL FROM CYLINDRICAL WORKPIECES
Filed Nov. 15, 1968            4 Sheets-Sheet 1

INVENTOR
GRIFFIN L. ISAACS
By Frank C. Manak III
Attorney

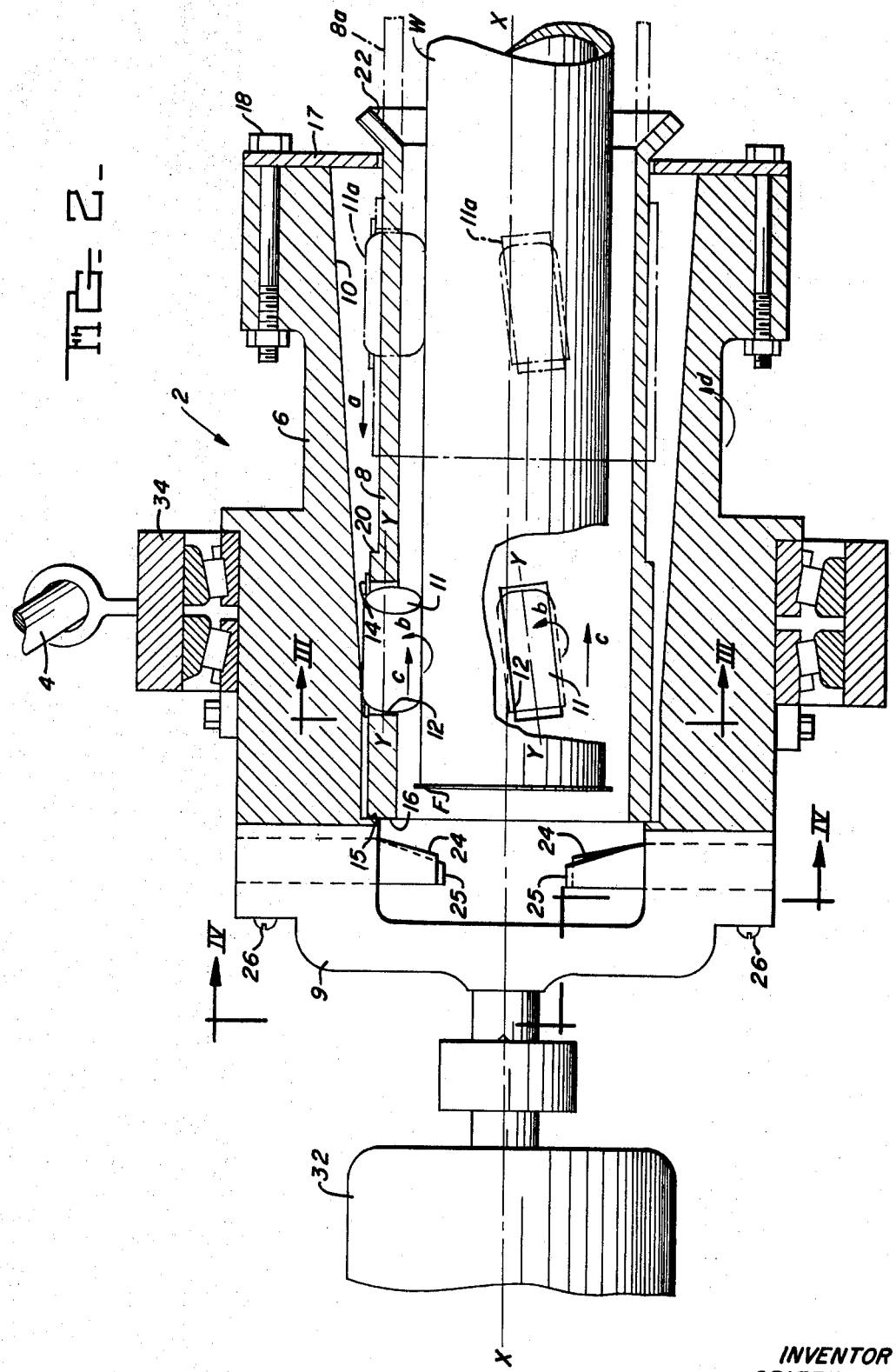

INVENTOR
GRIFFIN L. ISAACS
By Frank C. Manak IV
Attorney

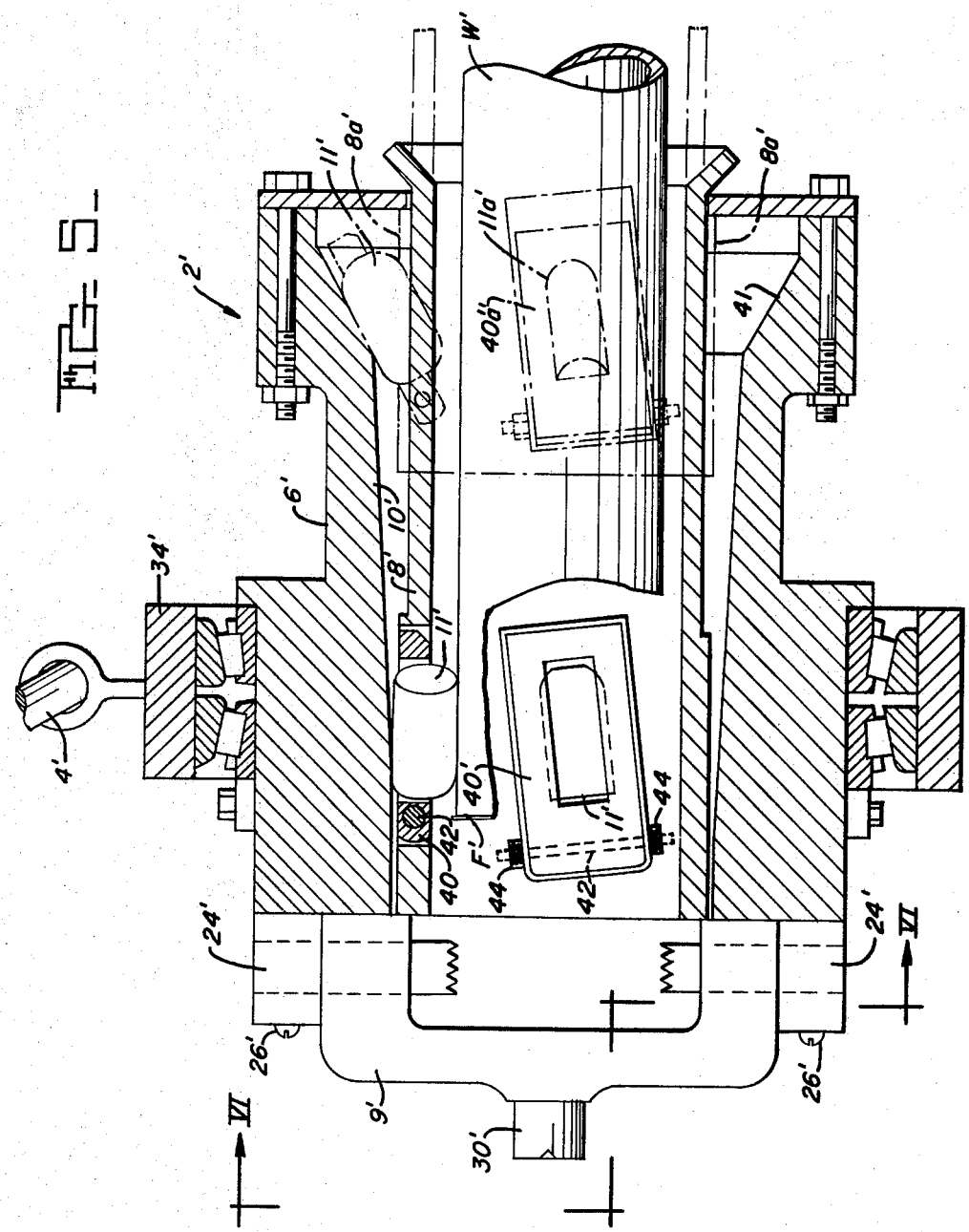

United States Patent Office 3,535,900
Patented Oct. 27, 1970

3,535,900
APPARATUS FOR REMOVING MATERIAL FROM CYLINDRICAL WORKPIECES
Griffin L. Isaacs, Hampton Township, Allegheny County, Pa., assignor to United States Steel Corporation, a corporation of Delaware
Filed Nov. 15, 1968, Ser. No. 776,039
Int. Cl. B21b 45/02
U.S. Cl. 72—40                3 Claims

ABSTRACT OF THE DISCLOSURE

Apparatus for machining or finishing a cylindrical workpiece in the vicinity of one of its ends. The apparatus is preferably designed as a portable unit which is held in the hand of the operator, often with the aid of an overhead sling. The apparatus includes outer and inner barrels, both of which fit over the workpiece. Rollers journaled in the wall of the inner barrel engage both the outer barrel and the workpiece. The axes of rotation of the rollers are at an angle to the axis of the workpiece so that rotation of the rollers draws both barrels axially over the workpiece. A machining or finishing tool is mounted at one end of the outer barrel, and the axial movement of the barrels over the workpiece brings this tool into engagement with the workpiece. Either the outer barrel or the workpiece may be driven to cause relative rotary motion between the workpiece and the outer barrel.

---

This invention relates to apparatus for machining or finishing a cylindrical workpiece, such as a metal bar or a pipe. The apparatus is particularly useful in removing burrs and fins from the cut ends of a long workpiece, but may also be used for other machining operations such as beveling, chamfering and the machining of threads. The apparatus is preferably designed as a portable, hand-held unit, which is fitted over the end of a workpiece standing on its own support.

In the past, many types of apparatus for performing machining and finishing operations on elongated workpieces have required much time and labor for production workers. For instance, to remove a fin from the end of a cut bar or pipe, a workman must often bend the fin back with a hammer, grind through the base of the fin with the edge of a grinding wheel, and then run the grinding wheel around the circumference to remove the burr. The employment of lathes or other more sophisticated apparatus has been impractical for extremely long workpieces, because of the set-up time required and the difficulties of moving each workpiece into position.

An object of my invention is to provide apparatus which machines or end-finishes a bar or pipe automatically and to a close tolerance, without requiring time consuming set-up operations, or handling operations that are extremely difficult with long workpieces.

The attainment of this and other objects will be more apparent from the following detailed description of my invention and the attached drawings in which:

FIG. 2 is an enlarged longitudinal section of the apparatus of FIG. 1, taken along line II—II of FIG. 1;

FIG. 5 is a longitudinal section, similar to FIG. 2, of apparatus for machining a workpiece, illustrating a modified form of my invention.

Figure 1:
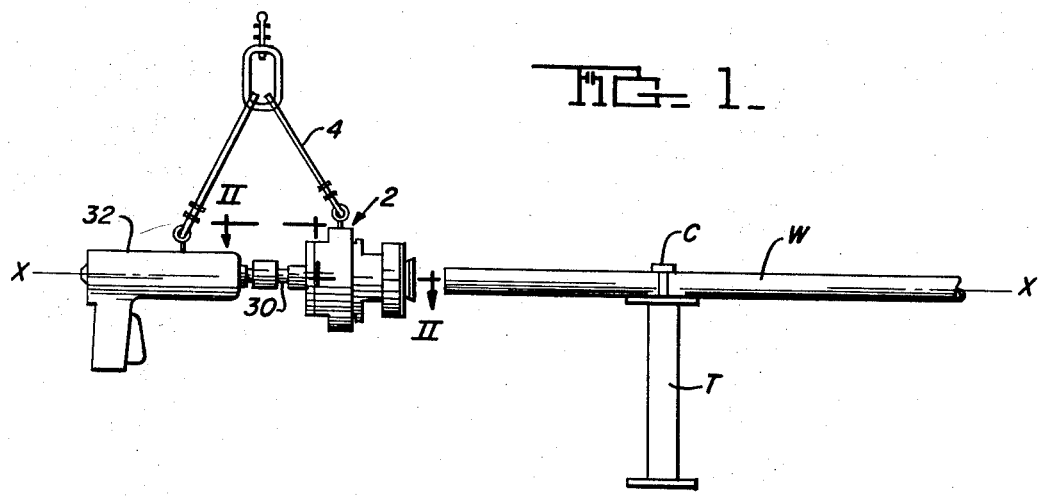
FIG. 1 is a side elevation of the apparatus for machining a workpiece, shown positioned at one end of the workpiece.

FIG. 1 shows a pipe W mounted on a support T and having a central axis X—X. A clamp C holds the pipe W stationary. To the left of the pipe is an end-finishing apparatus 2, constructed in accordance with my invention. The apparatus 2 is designed to be held in the hand of an operator, with or without the aid of an overhead sling 4.

As shown in sectional view of FIG. 2, the apparatus 2 includes outer and inner barrels 6 and 8, both of which fit over the pipe W. The outer barrel 6 has a tool holding yoke 9 at its left end, as viewed in FIG. 2. The inside surface 10 of outer barrel 6 is of conical shape, tapering inwardly from right to left.

Rollers 11 are journaled in slots 12 in the wall of inner barrel 8. They are designed to be wedged into rolling engagement between the conical surface 10 and the pipe W, in response to axial movement of inner barrel 8 in the direction of arrow *a* (FIG. 2). The axes of rotation Y—Y of rollers 11 are at an angle to the axis X—X of pipe W, so that the rolling of rollers 11 over pipe W in the direction of arrows *b* (FIGS. 2 and 3) causes the barrels 6 and 8 to move axially relative to the fixed pipe W in the direction of arrow *c* (FIG. 2).

Figure 3:
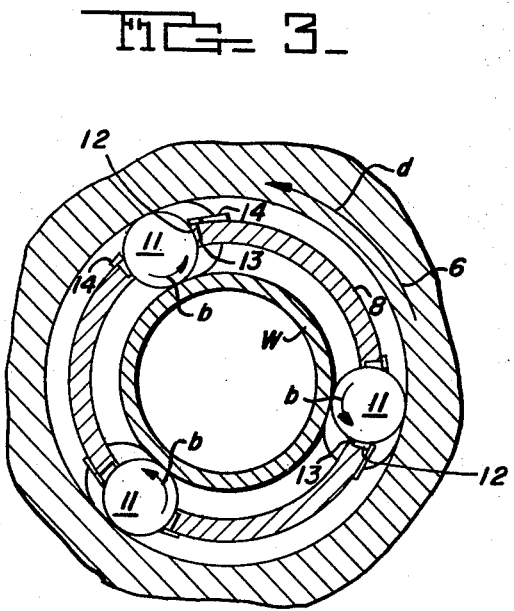
FIG. 3 is a section of the apparatus of FIG. 1, taken along line III—III of FIG. 2.

As seen in FIG. 3, small flanges 13 protrude into the slots 12, adjacent the inside of the wall of inner barrel 8. Similarly, detachable plates 14 overlap slots 12 on the outside of the inner barrel 8. Flanges 13 and plates 14 keep the rollers 11 held in place in the slots 12 but allow enough "play" for the rollers to move outwardly against the conical surface 10 of outer barrel 6. This allows the rollers 11 to accommodate slightly varying sizes of pipe W, when the inner barrel 8 is moved axially to wedge the rollers 11 between the conical surface 10 and the pipe W.

The axial movement of inner barrel 8 relative to the outer barrel 6 is limited in both directions. First, shoulder 15 on the inside of outer barrel 6 engages the left end face 16 of inner barrel 8 (FIG. 2), to limit the movement of barrel 8 to the left. Secondly, annular plate 17, attached by bolts 18 to the right end of outer barrel 6, engages shoulder 20 of inner barrel 8, to limit the movement of barrel 8 to the right (FIG. 2). Thus, the inner barrel 8 can neither be separated from outer barrel 6 nor moved too far toward the tool holding end 9 of outer barrel 6. For ease in inserting the pipe W into inner barrel 8, the right end of barrel 8 is preferably provided with a flared lip 22.

Figure 6:
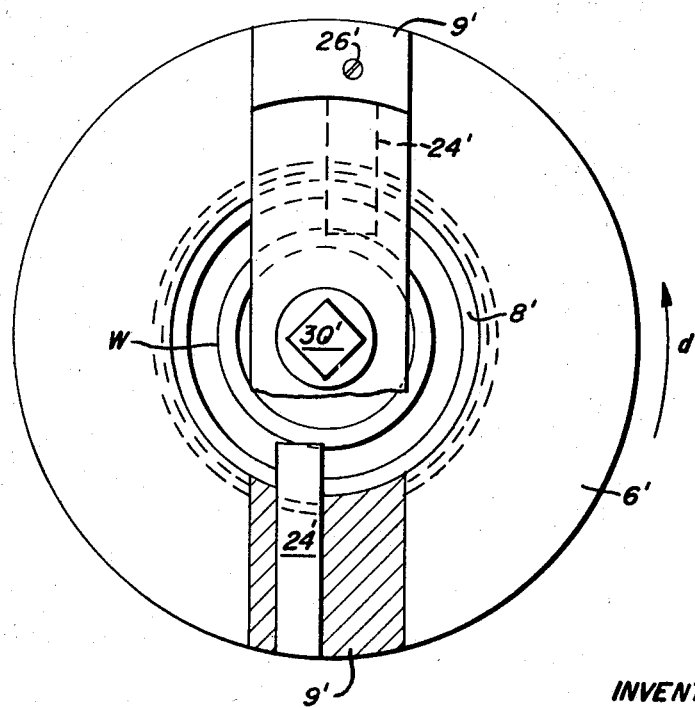
FIG. 6 is an end view of the apparatus of FIG. 5 with a part thereof broken away in a section taken along line VI—VI of FIG. 5.

In the tool holding yoke 9 at the end of outer barrel 6 cutting tools 24 and depth gauge bars 25 are held in place by set screws 26. The cutting tools 24 are designed for removing fin F and for providing a slight chamfer on the outside edge of pipe W. Depth gauge bars 25 limit the forward travel of the pipe W and thereby limit the depth of cut by the cutting tools 24. The tools 24 are shown only as an example of one of many types of finishing or machining tools that can be used in apparatus 2. An example of another type of tool is shown by the embodiment of FIGS. 5 and 6, to be discussed hereinafter.

Figure 4:
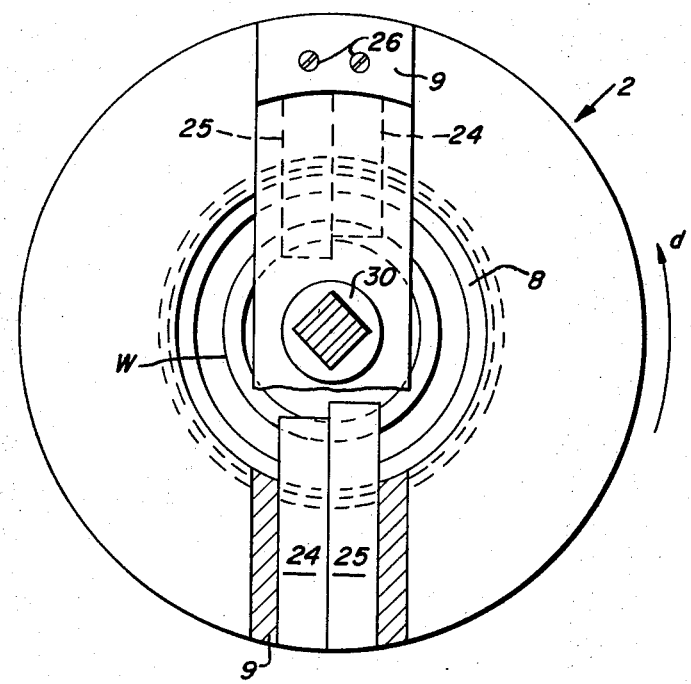
FIG. 4 is an end view of the apparatus of FIG. 1, with a part thereof broken away, in a section taken along line IV—IV of FIG. 2.

FIG. 4 shows how the tools 24 are positioned on the circumference of pipe W. While two tools 24 are shown in FIG. 3, any number of tools may be spaced around the circumference of the pipe. The preferred number of tools of course depends on the depth of machine cut and the type of finishing operation to the performed by the tools 24.

In the center of the tool holding yoke 9 is a drive shaft 30 (FIG. 1), which is detachably connected to an electric motor 32. The size and speed of the motor 32 depends on the size of the pipe W and the exact machining operation to be performed. For removing fins and chamfering three inch diameter pipe, a suitable motor would operate at about 50 revolutions per minute and deliver from 30 to 50 foot-pounds torque. For six inch pipe or longer, the motor may have a speed as low as 3 revolutions per minute, and deliver 60 to 100 foot-pounds torque.

The overhead sling 4, which helps the operator support the apparatus 2, is attached at one end to the housing of motor 32 (FIG. 1). At its other end, the sling 4 is connected to a fixed bearing ring 34 (FIG. 2), which rotatably houses the outer barrel 6.

In operation, apparatus 2 is prepared for placement over pipe W by first extending inner barrel 8 to its chain line position 8a (FIG. 2). Then, the apparatus is placed with both barrels enveloping the pipe W. The inner barrel 8 is shoved axially back to its solid line position in FIG. 2, so that the rollers 11 wedge between the conical surface 10 of the outer barrel 6 and the outer wall of pipe W.

The operator then turns on the motor 32, to rotate the outer barrel 6 in the direction of arrow d (FIGS. 2 and 3). This causes rollers 11 to roll over the fixed pipe W as indicated by arrows b. Of course, the inner barrel 8 moves with the rollers 11, also rotating about the pipe W in the direction of arrow d.

Due to the inclination of the axes Y—Y of rollers 11 to the axis X—X of pipe W, the rollers 11, rolling in the direction of arrows b over pipe W, advance spirally in the direction of arrow c, thereby drawing the outer barrel 6 and cutting tools 24 toward the left end of pipe W. The spiral rolling of rollers 11 actually tends to pull the outer barrel 6 over the pipe W at an even faster rate than the rollers themselves advance. Such pulling is inhibited by the conical shape of inner surface 10 of outer barrel 6, which causes the rollers 11 to be squeezed between the outer barrel 6 and pipe W. Thus, the pipe W becomes gripped very tightly by the rollers 11.

When the pulling of outer barrel 6 over pipe W brings the cutting tools 24 into contact with the left end of the pipe W, fin F is cut off by the rotary motion of the tools 24. The end corner of pipe W is also given a slight chamfer, and the advancement of the outer barrel 6 over the pipe W is stopped by the gauge bars 25.

The apparatus 2 is removed from the pipe W by reversing the motor 32, thereby causing the outer barrel 6 to rotate in the opposite direction from arrow d. This causes the rollers 11 to roll spirally off the pipe W. When the rollers 11 become disengaged from the pipe W, the apparatus 2 may be easily taken off the pipe, ready to be put on another pipe for a similar end finishing operation.

FIG. 5 shows a modification, in which rollers 11' have a special mounting which causes them to move out of the way to accommodate a pipe W' with a large fin F'. A carriage 40 is pivotally mounted about a pin 42 in the wall of inner barrel 8'. The carriage 40 is curved with the same radius of curvature as the wall of inner barrel 8 and supports rotatably the roller 11' in exactly the same way that rollers 11 are supported in the wall of inner barrel 8 of FIG. 2. Springs 44 around pins 42 force the carriage 40 to swing outwardly so that rollers 11' are at all times in contact with conical surface 10' of outer barrel 6'.

The conical surface 10' has a flared portion 46 at the right-hand end of outer barrel 6' (FIG. 5). Thus, when inner barrel 8' is pulled to its chain line position 8a' (FIG. 4), prior to inserting pipe W', the spring-loaded carriages 40 will swing outwardly to their chain line positions 40a, with rollers 11' being pressed against the flared surface 46. Thus the rollers 11' are swung away from the path of fin F' of pipe W.

A pipe threading tool 24' is mounted in the tool holding yoke 9' of apparatus 2'. Instead of end finishing pipe W', as with the first embodiment, threads are cut in the wall of the pipe upon engagement by tool 24' rotating in the direction of arrow d (FIG. 6). The replacement of the end finishing tool 24 with the pipe threading tool 24' thus illustrates the versatility of the apparatus 2 for use in many kinds of end finishing and machining operations.

In practice, the threading tool 24' would not be used until after large fin F' had been removed. The alternate tool 24' and the spring-loaded roller carriage 42 are shown on the same apparatus only because it is a convenient way of illustrating several modifications that can be made to the basic apparatus 2.

In other respects, the apparatus 2' is similar in form and operation to the apparatus 2 already described. This description has therefore not been repeated.

I claim:
1. Apparatus for removing material from a cylindrical workpiece having a longitudinal axis, comprising
   an outer barrel adapted for placement over said workpiece, said outer barrel having a tool support at one end and an inner wall of a conical shape, tapering inwardly toward the end with said tool support,
   an inner barrel held rotatable within said outer barrel and also adapted for placement over said workpiece,
   rollers journaled in the wall of said inner barrel and movable radially of said longitudinal axis so that axial movement of said inner barrel over said workpiece and within said outer barrel toward said tool support wedges said rollers into rolling engagement between said conical inner wall of said outer barrel and said cylindrical workpiece,
   said rollers being oriented on said inner barrel with their axes of rotation at an angle to the axis of said workpiece so that the rotation of said rollers causes relative axial movement between each of said barrels and said workpiece when the workpiece is engaged by said rollers,
   a tool mounted in said tool support and positioned for engagement with said elongated workpiece when the workpiece is fed by said rollers through said sleeve from the end opposite from said tool support,
   means for causing relative rotary motion between said workpiece and said outer barrel so as to advance said workpiece through said outer barrel by the rotation of said rollers and place said workpiece in rotary frictional engagement with said tool, and means for reversing said relative rotary motion so as to retract said workpiece from rotary frictional engagement with said tool.
2. Apparatus of claim 1 including
   carriages pivotally connected to said inner barrel so as to swing toward and away from said conical inner surface of said barrel,
   said rollers being journaled on said levers,
   said carriages being spring-loaded causing the levers to pivot and force said rollers into engagement with said conical inner wall of said outer barrel,
   said conical inner surface at the end of the outer barrel opposite from said tool support being of sufficient diameter to permit said rollers on said spring-loaded levers to be carried out of engagement with said workpiece.
3. Apparatus of claim 1 wherein said tool is an end finishing tool and is positioned in said tool support for engagement with the longitudinal wall adjacent the end of said cylindrical workpiece.

References Cited

UNITED STATES PATENTS

| 1,318,962 | 10/1919 | Brinkman | 72—70 |
| 1,914,587 | 6/1933 | Wise | 72—40 |
| 1,978,430 | 10/1934 | Kipnis | 72—119 |
| 3,340,840 | 9/1967 | Lechner | 113—120 |
| 3,426,565 | 2/1969 | Schott | 72—12 |

RICHARD J. HERBST, Primary Examiner

U.S. Cl. X.R.

72—78, 126